United States Patent Office 3,018,272  
Patented Jan. 23, 1962

3,018,272  
SULFONATE CONTAINING POLYESTERS DYEABLE WITH BASIC DYES  
John Malcolm Griffing, Grifton, N.C., and William Roscoe Remington, Wilmington, Del., assignors to E. I. du Pont de Nemours and Company, Wilmington, Del., a corporation of Delaware  
No Drawing. Filed Nov. 19, 1956, Ser. No. 622,811  
18 Claims. (Cl. 260—75)

This invention relates to film- and fiber-forming synthetic polyesters and the shaped articles produced therefrom. More particularly it is concerned with a modified fiber-forming, linear, condensation polyester, the shaped articles of which have affinity for basic type dyes.

It is an object of the present invention to provide a shaped article produced from a fiber-forming, linear, condensation polyester, the said article having affinity for basic type dyes.

Another object is to provide a process for the production of a fiber-forming, linear, condensation polyester from which shaped articles having affinity for basic type dyes can be prepared.

These and other objects will become apparent in the course of the following specification and claims.

The polymer of the present invention is useful in the production of shaped articles by extrusion, molding, casting or the like. These shaped articles in turn may be formed into yarns, fabrics, pellicles, ornaments, or the like.

In accordance with the present invention a film- and/or fiber-forming polyester is provided containing a sulfonate group in the form of a metallic salt, the said sulfonate group being a substituent of a repeating radical and the said radical comprising a minor proportion of the total said polyester. A preferred class of such polyesters is prepared from terephthalic acid or an ester-forming derivative thereof and a polymethylene glycol having the formula:

$$HO(CH_2)_nOH$$

wherein $n$ is an integer of from 2 to about 10, in the presence of at least about 0.5 mol percent, based on the terephthalate content of the polyester, of a compound containing at least one ester-forming functional group together with at least one sulfonate group in the form of a metallic salt. Examples of such sulfonate group containing compounds include metallic salts of sulfomonocarboxylic esters, sulfodicarboxylic esters, monohydric and dihydric alcohols containing at least one sulfonic acid group, and monohydric alcohols containing one carboxylic ester group and at least one sulfonic acid group. The preferred polyester product comprises a modified polymeric polymethylene terephthalate containing a sulfonate group as a substituent of a repeating radical, the said substituted repeating radical comprising a minor proportion of the total said polyester. The repeating radical bearing the sulfonate substituent is incorporated into its polymeric chain through carboxylic ester linkages, i.e. —COO—, the said repeating radical being attached to either the carbon or oxygen atom of the ester linkage. The radical may be incorporated into its polymer molecule by one, two or even more ester linkages. It will be recognized that the radical will act as a cross-linking agent if it is attached to the polymer molecule by more than two ester linkages. When it is desired to extrude the polymer into yarn, radicals capable of being attached to the polymer molecule by more than two ester linkages will usually be avoided.

The following examples are cited to illustrate the invention. They are not intended to limit it in any manner. Except where specific structure is noted, the chemical constitution of all dyes referred to herein is shown on pages 432–3 of the American Dyestuff Reporter, vol. 43, 1954.

*Example 1*

Ten parts of 5-sulfoisophthalic acid are dissolved in 100 parts of 85% methanol-15% benzene, and one part of sulfuric acid is added. A mixture of benzene, water and methanol is slowly distilled off during 24 hours, a constant level of esterification mixture being maintained by continuous addition of methanol-benzene solution. Potassium acetate is added to the reaction mixture and the solid product obtained is filtered off. The product is dissolved in hot water, neutralized with potassium carbonate, and decolorized with charcoal. When the solution is filtered and cooled, crystalline potassium 3,5-di-(carbomethoxy)benzenesulfonate is obtained. 1.6 parts of this product are added to 49 parts of dimethyl terephthalate, 34.5 parts of ethylene glycol, 0.067 part of calcium acetate, and 0.015 part of antimony trioxide, the ratio of diester sulfonate salt to dimethyl terephthalate being about 2 mol percent. The mixture is heated for three hours, during which time the temperature rises from 165° C. to 220° C. with evolution of methanol. The pressure is then reduced to 1 mm. of mercury and the temperature is increased to 275° C. After five hours a polymer is obtained having an intrinsic viscosity, determined in dilute solutions of the polymer in a mixture of 58.8 parts by weight of phenol and 41.2 parts by weight of trichlorophenol, of 0.57. The polymer is spun at 290° C. through a 34-hole spinneret (orifice diameter of 0.009 inch). The yarn is collected at about 1,000 y.p.m. and drawn about 3.4 times its extruded length to produce a 70-denier yarn having tenacity of 3.8–4.0 grams per denier and an elongation of 21%. The yarn has an excellent white color. A swatch of knit tubing prepared from this yarn is treated for two hours at 125° C. with an aqueous solution of 3% (based on fabric weight) of Genacryl Red 6B dye, a basic dye of the quaternary ammonium type. The fabric is dyed a medium shade of red having good wash-fastness properties.

1.9 parts of sodium 1,8-di(carbomethoxy)napthalene-3-sulfonate, prepared by boiling the sodium salt of 3-sulfo-1,8-naphthalenedicarboxylic acid with dimethyl sulfate, may be substituted for the potassium 3,5-di(carbomethoxy)benzene-sulfonate in the above polymerization, to obtain the corresponding naphthalene derivative.

A control sample of polyethylene terephthalate yarn is prepared following the above procedure, except that 50 parts of dimethyl terephthalate is used and no potassium 3,5-di(carbomethoxy)benzenesulfonate is added. The resulting polymer has an intrinsic viscosity of 0.58, and the yarn has a tenacity of 4.4 g.p.d. and an elongation of 21%. The yarn is nearly white in color, but appears faintly cream-colored when compared with the above yarn. When dyed with Genacryl Red 6B dye under the conditions used above, the control yarn adsorbs virtually none of the dye, and what little color appears is removed easily by washing.

A mixture of 47.5 parts of dimethyl terephthalate, 34.5 parts ethylene glycol, 4 parts of potassium 3,5-di(carbomethoxy)benzenesulfonate, 0.067 part of calcium acetate, and 0.015 part of antimony trioxide is subjected to ester interchange and polymerization as shown above to produce a polymer having about 5 mol percent of sulfonate salt, based on the terephthalate content. The polymer has an intrinsic viscosity of 0.55, and the yarn has a tenacity of 2 g.p.d. and an elongation of 21%. It has an excellent white color. When dyed with Genacryl Red 6B dye under the conditions used above, the fabric assumes a deep shade of red having good wash-fastness properties.

Example 2

The esterification of 5-sulfoisophthalic acid in methanol-benzene solution, as described in Example 1, is repeated, following which sodium acetate is added to the reaction mixture and the solid product obtained is filtered off. The product is dissolved in hot water, neutralized with sodium carbonate, and decolorized with charcoal. When the solution is filtered and cooled, crystalline sodium 3,5-di(carbomethoxy)benzene sulfonate is obtained. 1.5 parts of this product are added to 49 parts of dimethyl terephthalate, 33.8 parts of ethylene glycol, 0.040 part of sodium methoxide, 0.023 part of manganous acetate·2.5 hydrate, and 0.015 part of antimony trioxide, the ratio of diester sulfonate salt of dimethyl terephthalate being about 2 mol percent. The mixture is heated for three hours, during which time the temperature rises from about 160° C. to 220° C. with evolution of methanol. The pressure is then reduced to 1 mm. of mercury and the temperature is increased to 275° C. After three hours a polymer is obtained having an intrinsic viscosity of 0.56. Yarn spun from this polymer and drawn about 3.3 times its extruded length has a tenacity of 3.8 g.p.d. and an elongation of 21%. Tubing knitted from this yarn is treated for two hours at 125° C. with an aqueous solution of 3% (based on fabric weight) of a basic dye of the oxazine type having the following chemical structure:

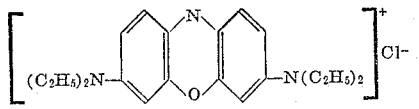

The fabric is dyed a deep shade of blue, whereas a control sample of unmodified polyethylene terephthalate adsorbs virtually none of the dye.

Example 3

Using the general procedure outlined in Example 1, potassium 2,5-di(carbomethoxy)benzenesulfonate is prepared by esterifying sulfoterephthalic acid in methanol-benzene solution and making the potassium salt. 1.6 parts of this product are added to 49 parts of dimethyl terephthalate, 34.5 parts of ethylene glycol, 0.022 part of manganese acetate, and 0.015 part of antimony trioxide, the ratio of the sulfonate salt to dimethyl terephthalate being about 2 mol percent. The mixture is heated for three hours, during which time the temperature rises from 155° C. to 220° C. with evolution of methanol. The pressure is then reduced to 1 mm. of mercury, and the temperature is increased to 275° C. After five hours a polymer is obtained having an intrinsic viscosity of 0.53. Yarn spun from this polymer and drawn about 3.5 times its extruded length has a tenacity of 4.0 g.p.d. and an elongation of 21%. A swatch of tubing knitted from this yarn is treated for two hours at 125° C. with an aqueous solution of 3% (based on fabric weight) of Genacryl Blue 6G dye. The fabric is dyed a medium shade of blue having good wash-fastness properties. A control sample of fabric of polyethylene terephthalate yarn prepared without using the sulfonate salt additive adsorbs virtually none of the dye.

Example 4

1.2 parts of sodium p-carbomethoxybenzenesulfonate are added to 49 parts of dimethyl terephthalate, 34.5 parts of ethylene glycol, 0.067 part of calcium acetate, and 0.015 part of antimony trioxide, the ratio of the sulfonate salt to dimethyl terephthalate being about 2 mol percent. Methanol is removed from the reaction mixture of 165° C.–220° C. during three hours, following which the mixture is polymerized at 275° C. and 1 mm. of mercury for five hours, resulting in a polymer having an intrinsic viscosity of 0.52. Yarn spun from this polymer and drawn 3.4× has a tenacity of 4.0 g.p.d. and an elongation of 21%. The tubing prepared from this yarn is treated for two hours at 125° C. with an aqueous solution of 3% (based on fabric weight) of Genacryl Pink G dye. The fabric is dyed a medium shade of pink, whereas a control sample of unmodified polyethylene terephthalate fabric adsorbs very little of this dye under the same dye bath conditions.

Example 5

1.2 parts of sodium m-carbomethoxybenzenesulfonate and 0.75 part of sodium 3,5-di(carbomethoxy)benzenesulfonate are added to 48.5 parts of dimethyl terephthalate, 34.5 parts of ethylene glycol, 0.023 part of manganous acetate·2.5 hydrate, and 0.015 part of antimony trioxide, the ratios of the two sulfonate salts to dimethyl terephthalate being about 2 and 1 mol percent, respectively. Methanol is removed from the reaction mixture at 155° C.–220° C. during three hours, following which the mixture is polymerized at 275° C. and 1 mm. of mercury for five hours, resulting in a polymer having an intrinsic viscosity of 0.48. Yarn spun from this polymer and drawn about 3.5 times its extruded length has a tenacity of 3.5 g.p.d. and an elongation of 22%. A skein of this yarn is treated for one hour at 100° C. with an aqueous solution of 1% (based on fiber weight) of the basic dye having the structure shown in Example 2. The yarn is dyed a medium shade of blue. As noted in Example 2, unmodified polyethylene terephthalate has very little affinity for this dye.

Example 6

Ten parts of biphenyl-4,4'-dicarboxylic acid are dissolved in 45 parts of oleum (30% $SO_3$). The mixture is heated at 210° C. for six hours. Upon cooling it is poured over cracked ice. The dried product is esterified in methanolbenzene solution and converted to the potassium salt as described in Example 1. The product, potassium 4,4'-di(carbomethoxy)biphenyl-2-sulfonate, is purified by recrystallization from glacial acetic acid. Two parts of the product are added to 49 parts of dimethyl terephthalate, 34.5 parts of ethylene glycol, 0.067 part of calcium acetate, and 0.015 part of antimony trioxide and the mixture is subjected to ester interchange for three hours and polymerization for five hours under the conditions described in the preceding examples. The resulting polymer, which contains 2 mol percent sulfonate salt (based on the terephthalate content), has an intrinsic viscosity of 0.62. A film pressed from this polymer is treated for two hours at 125° C. with an aqueous solution of 3% (based on the weight of the film) of Fuchsine SBP dye, a basic dye of the triphenylmethane type. The film is dyed a medium shade of purple, whereas a film pressed from a control sample of unmodified polyethylene terephthalate prepared as described in Example 1 adsorbs virtually none of this dye.

Example 7

Ten parts of 5-sulfoisophthalic acid are dissolved in 100 parts of 85% methanol–15% benzene. A mixture of benzene, water, and methanol is slowly distilled off during 24 hours, a constant level of esterification mixture being maintained by continuous addition of methanol-benzene solution. Calcium acetate is added to the reaction mixture and the solid product, calcium 3,5-di(carbomethoxy)-benzenesulfonate, is filtered off and dried. 1.6 parts of this product are added to 49 parts of dimethyl terephthalate, 34.5 parts of ethylene glycol, 0.067 part of calcium acetate, and 0.015 part of antimony trioxide, the ratio of sulfonate salt to dimethyl terephthalate being about 2 mol percent. The mixture is subjected to ester interchange for three hours and polymerization for five hours under the conditions described in previous examples, whereupon a highly polymeric material of exceptional opacity having an excellent white color is obtained. A thin film pressed from this polymer is treated for two hours at 125° C. with an aqueous solution of 3% (based on the weight of the film) of Methyl Violet 2B dye. The film is dyed a medium violet shade having excellent wash-fastness, whereas a film pressed from a control sample of unmodified polyethylene terephthalate prepared as described in Example 1 adsorbs only a faint tint of the dye, which is easily removed by washing.

*Example 8*

The experiment of Example 7 is repeated, using lanthanum acetate to prepare lanthanum 3,5-di(carbomethoxy)-benzenesulfonate and using 1.6 parts of the lanthanum sulfonate salt in place of the calcium sulfonate salt to prepare the polymer. The product is a highly polymeric material which is more translucent than the polymer prepared from the calcium salt. A think film pressed from this polymer is treated for two hours at 125° C. with an aqueous solution of 3% (based on the weight of the film) of Brilliant Blue 6G dye. The film is dyed a medium shade of blue having excellent wash-fastness, whereas a film pressed from a control sample of unmodified polyethylene terephthalate prepared as described in Example 1 adsorbs virtually none of this dye under the same conditions.

*Example 9*

The experiment of Example 7 is repeated, using lead acetate to prepare lead 3,5-di(carbomethoxy)benzenesulfonate and using 2.0 parts of the lead sulfonate salt in place of the calcium salt to prepare the polymer. The product is a highly polymeric material which is more translucent than the polymer prepared from the calcium salt. A thin film pressed from this polymer is treated for two hours at 125° C. with an aqueous solution of 3% (based on the weight of the film) of Fuchsine SBP dye. The film is dyed a medium shade of purple which has excellent wash-fastness properties. As noted in Example 6, unmodified polyethylene terephthalate has very little affinity for this dye.

*Example 10*

10 parts of 3,5-disulfobenzoic acid are dissolved in 100 parts of 85% methanol–15% benzene and a mixture of benzene, water, and methanol is slowly distilled off during 24 hours with continuous addition of methanol-benzene solution to maintain a constant level of mixture. Potassium acetate is added to the reaction mixture and the solid product obtained is filtered off. The product is dissolved in hot water, neutralized with potassium carbonate, and decolorized with charcoal. When the solution is filtered and cooled, crystalline dipotassium 5-carbomethoxybenzene-1,3-disulfonate is obtained. 0.9 part of this product is added to 49 parts of dimethyl terephthalate, 34.5 parts of ethylene glycol, 0.067 part of calcium acetate, and 0.015 part of antimony trioxide, the ratio of sulfonate salt to dimethyl terephthalate being about 1 mol percent. The mixture is subjected to ester interchange for three hours and polymerization for five hours in accordance with the technique used in the previous examples, a resulting polymer having an intrinsic viscosity of 0.52. A film of this polymer treated for two hours at 125° C. with an aqueous solution of 3% (based on the weight of the film) of Methylene Blue SP dye, a basic dye of the sulfonium type. The film is dyed a medium shade of blue, whereas a film pressed from a control sample of unmodified polyethylene terephthalate prepared as described in Example 1 adsorbs only a faint tint of blue, which is easily removed by washing.

*Example 11*

0.8 part of sodium 3-hydroxypropane-1-sulfonate is added to 49 parts of dimethyl terephthalate, 34.5 parts of ethylene glycol, 0.023 part of manganous acetate·2.5 hydrate, and 0.015 part of antimony trioxide, the ratio of the sulfonate salt to dimethyl terephthalate being about 2 mol percent. Methanol is removed from the reaction mixture as the temperature is raised from 165° C. to 220° C. during three hours, following which the mixture is polymerized at 275° C. and 1 mm. of mercury for three hours, resulting in a polymer having an intrinsic viscosity of 0.32. A film pressed from this polymer is treated for two hours at 125° C. with an aqueous solution of 3% (based on the weight of the film) of a 1,3,3-trimethyl-2-[p-(N-methyl-N-β-cyanoethylamino)styryl] pseudo indolin salt, a basic dye of the quaternary ammonium type as disclosed by Winter et al. in United States Patent 2,164,793. The film is dyed a medium shade of red, whereas a film pressed from a control sample of unmodified polyethylene terephthalate adsorbs only a faint tint of dye.

*Example 12*

86.00 parts of diethyl malonate is added to a solution of sodium ethoxide prepared from 8.24 parts of sodium and 169 parts of absolute ethanol. To this stirred solution, 43.66 parts of propane sultone is added whereupon a marked rise in temperature occurs. The solution is then heated under reflux for thirty hours. The solid which separates on cooling, sodium 4,4-dicarbethoxy-1-butanesulfonate, has a melting point of 160° C. after recrystallization from ethanol. 1.5 parts of this product are added to 49 parts of dimethyl terephthalate, 34.5 parts of ethylene glycol, 0.023 part of manganous acetate. 2.5 hydrate, and 0.015 part of antimony trioxide, the ratio of the sulfonate salt to dimethyl terephthalate being about 2 mol percent. After removing methanol from the reaction mixture and polymerizing as taught in Example 11 a polymer is formed which has an intrinsic viscosity of 0.32. A film pressed from this polymer is treated for one hour at 125° C. with an aqueous solution of 3% (based on the weight of the film) of the basic dye used in Example 11. The film is dyed a medium shade of red.

*Example 13*

2.96 parts of sodium 3,5-di(carbomethoxy) benzenesulfonate are added to 95.06 parts of dimethyl terephthalate, 90.5 parts of butanediol-1,4, and 0.0425 part of manganous acetate·2.5 $H_2O$, the ratio of the sulfonate salt to dimethyl terephthalate being about 2 mol percent. Methanol is removed from the reaction mixture at a temperature increasing from about 175 to 200° C. over a three hour interval, following which 0.002 part of tetra-isopropyl titanate is added and the mixture is polymerized at 240° C. and 1 mm. of mercury for one hour. The resulting polymer has an intrinsic viscosity of 0.41. A thin film pressed from this polymer is treated for two hours at 100° C. with an aqueous solution of 1% (based on the weight of the film) of the basic dye having the structure shown in Example 2. The film is dyed a deep shade of blue having excellent wash-fastness.

A control sample of polybutylene terephthalate film is prepared following the above instructions, except that 97 parts of dimethyl terephthalate is used and no sodium 3,5-di(carbomethoxy)benzenesulfonate is added. The resulting polymer has an intrinsic viscosity of 0.40. Film pressed from this polymer, when subjected to the same dyebath conditions described above, adsorbs only a faint tint of the dye.

As mentioned previously, the preferred composition is a polymeric polymethylene terephthalate containing in the polymer molecule a minor proportion of any organic radical containing at least one sulfonate group in the form of a metallic salt. Such polymers are usually prepared by ester interchange and polymerization reactions as illustrated. Other methods of preparation will be obvious to those skilled in the art.

Polymeric polymethylene terephthalates of the present invention wherein the sulfonate salt group is attached to an aromatic nucleus are of particular utility, since the sulfonate salt additives from which the polymeric products are prepared are usually relatively stable at the high temperatures necessary for rapid polymerization. Such polymers may be prepared by copolymerization as disclosed above or ester interchange as disclosed hereinafter, employing as a monomer a compound of the formula:

wherein

is a member of the class consisting of a metallic salt of a divalent arylene radical and a metallic salt of a divalent alkylene radical of such character that R is separated from the —SO₃M radical by at least 3 carbon atoms, R being a member of the class consisting of

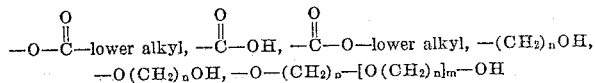

and

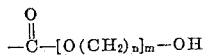

$n$ and $m$ being numbers and $n$ being greater than 1 and R' being a member of the class consisting of hydrogen and R. Such polymers will contain a unit of the structure:

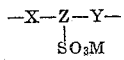

wherein —X— is a divalent radical of the class consisting of

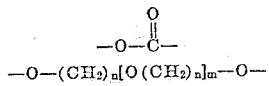

and

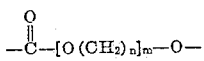

and —Y— is —X— or —H. While the examples are specifically illustrative of the nuclear substituted carboxylic derivative, it is obvious that alkaryl derivatives containing one or more side chains having terminal ester-forming groups may likewise be employed. Among such substances may be mentioned potassium p-hydroxyethoxybenzenesulfonate (prepared by reacting one mol of potassium p-hydroxybenzenesulfonate with one mol of ethylene oxide), potassium 2,5-bis(hydroxyethoxy)benzenesulfonate (prepared by reacting one mol of potassium hydroquinonesulfonate with two mols of ethylene oxide), lithium 2-carob-beta-hydroxyethoxy-5-hydroxyethoxybenzenesulfonate (prepared by reacting one mol of lithium 4-hydroxy-2-sulfobenzoic acid with two mols of ethylene oxide) and the like. Where necessary to avoid degradation the polymeric product may be formed over a longer period of time at lower temperatures and/or under very high vacuum.

Polymers containing units of the structure:

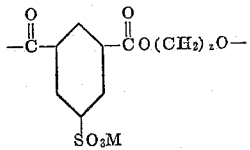

wherein the hexagon represents the benzene nucleus, z is an integer of from 2 to about 10, and M represents any metallic element, are particularly desirable embodiments of the present invention. Such polymers are prepared from metallic 3,5-di(carboalkoxy)benzenesulfonates which are extremely stable at the high temperatures desired for rapid polymerization. Modified polymeric polymethylene terephthalates containing units of this structure, when prepared under the usual polymerization conditions, have an excellent white color, in many cases even better than control samples of unmodified polymethylene terephthalates. Such polymers usually are found to have a very low ether content (2% ethers or even lower). Moreover, metallic 3,5-di(carboalkoxyl)benzenesulfonates undergo ester interchange with ethylene glycol very rapidly and can be polymerized to homopolymers of low molecular weight, which can then be added to molten polymeric polymethylene terephthalates to form a modified polymer with a very short additional polymerization time.

The organic radical bearing the metallic sulfonate salt as a substituent may be incorporated in the fiber- and/or film-forming polyester as a component of a distinct "preformed" polyester, as for instance by melt blending a minor proportion of a preformed polyester rich in such metallic sulfonate salt substituents with a fiber-forming polyester. Such a technique is illustrated in Examples 14 and 15 below.

*Example 14*

A "preformed" polyester rich in metallic sulfonate salt substituted and suitable for blending with a fiber-forming polyester is prepared by mixing 1.6 parts of potassium 3,5-di(carbomethoxy)-benzenesulfonate with 0.7 part of ethylene glycol, 0.0013 part of calcium acetate, and 0.0003 part of antimony trioxide. The mixture is heated for 90 minutes, during which time the temperature rises from 165° C. to 220° C. with evolution of methanol. The pressure is then reduced to 1 mm. of mercury and the temperature is increased to 275° C. The mixture is maintained at this temperature and pressure for four hours, during which time a low molecular weight polymer, solid at 275° C. is formed.

A fiber-forming polymer is then prepared by mixing 49 parts of dimethyl terephthalate with 34 parts of ethylene glycol, 0.066 part of calcium acetate, and 0.015 part of antimony trioxide. This mixture is heated for three hours with evolution of methanol, the temperature rising from 165° C. to 220° C. The pressure is then reduced to 1 mm. of mercury, and the temperature is increased to 275° C. After four hours a relatively viscous liquid is formed. The "prepolymer" prepared as described above and in pulverized form is then added to the fiber-forming molten polymer. The combined reaction mixture is heated at 275° C. for an additional 30 minutes at 1 mm. of mercury. The resulting copolymer has an intrinsic viscosity of 0.59. A thin film of this polymer is cast and treated for two hours at 125° C. with an aqueous solution of 3% (based on the weight of the film) of Methylene Blue SP dye. The film is dyed a medium shade of blue, which exhibits good wash-fastness properties.

*Example 15*

2.3 parts of sodium 3,5-di(carbomethoxy)benzene-sulfonate and 3.6 parts of sodium m-carbomethoxybenzenesulfonate are added to 45.5 parts of dimethyl terephthalate, 34.5 parts of ethylene glycol, 0.023 part of manganous acetate·2.5 hydrate, and 0.015 part of antimony trioxide, the ratios of the two sulfonate salts to dimethyl terephthalate being about 3.3 and 6.5 mol percent, respectively. The mixture is heated for three hours, during which time the temperature rises from 155° C. to 220° C. with evolution of methanol. The pressure is then reduced to 1 mm. of mercury, and the temperature is increased to 275° C. After six hours a polymer is obtained having in intrinsic viscosity of 0.38. 50 parts of this polymer are blended intimately with 100 parts of polyethylene terephthalate of intrinsic viscosity of 0.65. Yarn spun from this blended polymer and drawn about 3.5 times its extruded length has a tenacity of 3.4 g.p.d. and an elongation of 22%. A skein of this yarn is treated for one hour at 100° C. with an aqueous solution of 1% (based on fiber weight) of the basic dye having the structure shown in Example 2. The yarn is dyed a medium shade of blue.

In general, ester-forming additives containing sulfonate salt groups are readily prepared by standard chemical preparative techniques. Compounds having more than two ester-forming functions may be used where a cross-linked polymer is desired. The presence of functional groups other than the ester-forming groups and the sulfonate salt groups are usually avoided. In general, it is preferred to use sulfonate salts of alkali and alkaline earth metals. However, the sulfonate salt of other metallic elements may be used, as illustrated in the examples. In cases in which the sulfonate salt is highly insoluble, fine dispersion of the additive may be required during the early stages of the polymerization reaction. Metals which normally exhibit color in their salts may, if used to form the sulfonate salts of this invention, contribute a pale color to the polymer.

It will usually be desirable to use at least about 0.5 mol percent of the sulfonate salt, based on the terephthalate content of the polymer; polymer having a sulfonate salt content of appreciably lower than 0.5% will usually have only a relatively low affinity for basic dyes. Polymers containing about 10 mol percent of the sulfonate salt additive have a very high affinity for basic dyes. Higher concentrations will not lead to appreciable increases in basic dye-ability, and in the case of certain of the sulfonate salts may unduly affect tenacity. Sulfonate salt concentrations in the range of 2 to 5 mol percent are regarded as optimum and are preferred. It will be realized that the mono-functional ester-forming derivatives act as chain terminators in the condensation reaction and will tend to lower the molecular weight of the polymer when they are used in high concentration. Di-functional ester-forming derivatives will usually be selected when polymers of especially high molecular weight are desired. Since the sulfonate salt modifiers are roughly equivalent to each other on a molar basis, mixtures of two or more may be used with an effect approximately proportional to the total molar quantity used.

Various other materials may be present in the reaction mixture. For example, such ester exchange catalysts as salts of calcium, manganese, or lanthanum and such polymerization catalysts as antimony oxide will usually be present. Color inhibitors, such as alkyl or aryl phosphate esters, may be used. In addition, pigments, delusterants, or other additives may be present, such as titanium dioxide or barium carbonate.

If desired, in producing polymeric polymethylene terephthalates modified with sulfonate salt derivatives, other glycols (such as 1,4-bis[hydroxyethoxy]benzene) or other esters (such as isophthalates, succinates, adipates and p,p'-bibenzoates) may be added to the reaction mixture in amounts up to about 10 mol percent and more to produce complex copolyesters. Quantities of up to about 10 weight percent of other polymeric materials, especially those containing ester or hydroxyl end groups, may be melt blended with copolymers of the present invention. A typical copolymer is exemplified in Example 16.

*Example 16*

1.2 parts of sodium 3,5-di(carbomethoxy)benzenesulfonate are added to 41.6 parts of dimethyl terephthalate, 37 parts of ethylene glycol, 2.6 parts of dimethyl sebacate, 0.003 parts of sodium methoxide, 0.014 part of antimony trioxide, and 0.02 part of manganous acetate·2.5 hydrate, the ratio of the sulfonate salt to dimethyl terephthalate being about 1.75 mol percent and that of the dimethyl sebacate to dimethyl terephthalate being about 5.0 mol percent. Methanol is removed from the reaction mixture as the temperature rises from about 155° C. to 220° C. over a period of three hours. Thereafter the mixture is polymerized at 275° C. and 1 mm. of mercury for five hours, resulting in a polymer having an intrinsic viscosity of 0.57. Yarn spun from this polymer and drawn 2.7× has a tenacity of 2.9 g.p.d. and an elongation of 21%. A skein is treated for one hour at 100° C. with an aqueous solution of 1% (based on fiber weight) of the basic dye having the structure shown in Example 2. The yarn is dyed a medium shade of blue.

Although modified polymeric polymethylene terephthalates are the preferred species of the present invention owing to the high utility of these polymers, the scope of the invention extends to the modification of other fiber-forming linear condensation polyesters. Numerous examples of such linear condensation polyesters are known. Dicarboxylic acids which may be used include aliphatic acids, such as oxalic acid; cycloaliphatic acids, such as hexahydroterephthalic acid, and aromatic acids, such as bibenzoic acid; esters or other derivatives of these dicarboxylic acids may also be used. Similarly, an aliphatic or cycloaliphatic glycol or an ester thereof is suitable or an ester of an aromatic diol may be used. Linear condensation polyesters formed by the self-condensation of a hydroxy acid or hydroxy ester may also be rendered sensitive to basic dyes by the process of the present invention. Preferred fiber-forming linear condensation polyesters are those in which the solidified polyester fibers remain tenacious when immersed in water at 100° C. Fibers which dissolve, melt, or become quite soft in boiling water obviously have relatively little utility as textile fibers which are intended to be dyed, since nearly all commercial textile dyeing operations are carried out in water at or above 100° C. Typical polyesters of acids other than terephthalic acid, are illustrated in Examples 17 and 18.

*Example 17*

2.96 parts of sodium 3,5-di(carbomethoxy)benzene-sulfonate are added to 98 parts of dimethyl hexahydroterephthalate, 66 parts of ethylene glycol, 0.0425 part of manganous acetate, and 0.0284 part of antimony trioxide, the ratio of the sulfonate salt to dimethyl hexahydroterephthalate being about 2 mol percent. Methanol is removed from the reaction mixture as the temperature is raised from about 190–220° C. over a two hour period. Polymerization is then continued at 275° C. under 1 mm. of mercury for two hours, resulting in a polymer having an intrinsic viscosity of 0.40. The polymer is pressed into thin films onto a backing of satin-faced ribbon prepared from unmodified polyethylene terephthalate yarn. When the film is treated for two hours at 100° C. with an aqueous solution of 1% (based on the weight of the film) of the basic dye having the structure shown in Example 2, it is dyed a medium shade of blue.

A control sample of polyethylene hexahydroterephthalate is prepared following the above instructions, except that 100 parts of dimethyl hexahydroterephthalate is used and no sodium 3,5-di(carbomethoxy)benzenesulfonate is used. The resulting polymer has an intrinsic viscosity of 0.64. Thin films of the polymer pressed onto a backing or polyethylene terephthalate satin-faced ribbon adsorb only a faint blue tint of color when subjected to the dye-bath conditions described above.

*Example 18*

0.46 part of sodium 3,5-di(carbomethoxy)benzene sulfonate is added to 15 parts of methyl p-(2-hydroxyethoxy) benzoate and 0.05 part of tetraisopropyl titanate, the ratio of the sulfonate salt to the benzoate ester being about 2 mol percent. The mixture is polymerized at 240° C. and 0.5 mm. of mercury for 1.5 hours, resulting in a polymer having an intrinsic viscosity of 0.20. A film pressed from this polymer is treated for two hours at 100° C. with an aqueous solution of 1% (based on the weight of the film) of the basic dye having the structure shown in Example 2. The film is dyed a deep shade of blue, and the film retains its deep blue color after repeated scourings in hot water and in hot chlorobenzene and other organic solvents.

A control sample of polyethylene p-oxybenzoate is prepared following the above instructions, except that no sodium 3,5-di(carbomethoxy)benzenesulfonate is used. The resulting polymer has an instrinsic viscosity of 0.18.

Films prepared from the unmodified polymer, when dyed under the conditions described above, exhibit a medium blue color; however, scourings in hot water or in hot chlorobenzene and other organic solvents leach the dye from the film, leaving the film with only a faint blue color.

The yarns produced in accordance with the present invention are suitable for the usual textile applications. They may be employed in the knitting or weaving of fabrics of all types as well as in the production of nonwoven, felt-like products produced by known methods. Their physical properties closely parallel those of their related polyester fibers. However, they have particular sensitivity toward basic dyes. By a "basic dye" is meant a colored cationic organic substance such as those containing sulfonium, oxonium, or quaternary ammonium functional groups. Among the basic dyes which may be applied to the filament formed in accordance with the present invention may be mentioned Victoria Green WB (C.I. 657); Thodamine B (C.I. 749); Brilliant Green B (C.I. 662); Victoria Pure Blue BO (Pr. 198); and the like. The dyes are preferably applied from an aqueous solution at a temperature between about 100° and 125° C. If desired, the aqueous solution may be acidic and other dyebath additives such as sodium sulfate, sodium acetate or quaternary ammonium salts, may be present.

Filaments and films, i.e. shaped structures which have at least one dimension relatively very small and at least one dimension relatively large, are the preferred structures of the present invention. Such structures of the polymers of this invention are permeated uniformly throughout by basic dyes applied from hot aqueous solution. The penetration of dyes is an important characteristic since poor resistance to fading and loss of color through rubbing or abrasion is a known characteristic of structures which retain dye only at their surfaces. This application is a continuation in part of United States application Ser. No. 519,269, filed June 30, 1955.

Many equivalent modifications will be apparent to those skilled in the art from a reading of the above without a departure from the inventive concept.

What is claimed is:

1. A linear carbonyl-oxy polyester composed of repeating ester units wherein the carbonyl-oxy linkages are an integral part of the polymer chain, having an intrinsic viscosity of at least about 0.20 in a mixture of 58.8 parts of phenol and 41.2 parts of trichlorophenol; the said polyester consisting of from about 0.5 mol percentage to about 10 mol percentage, based on the said ester units of the said polyester, of a basic dye sensitizing unit which is a metallic salt of the structure

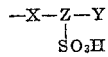

wherein

is a divalent radical of the class consisting of (1) an —SO₃H substituted alkylene radical of such character that —X— is separated from the —SO₃H group by at least 3 carbon atoms and (2) an —SO₃H substituted arylene radical; —X— is a divalent member of the class consisting of carbonyl - oxy, oxy-polymethylene - oxy, poly(oxy-polymethylene)-oxy (carbonyl-oxy-polymethylene-oxy, and carbonyl-poly(oxy-polymethylene)-oxy, the said polymethylene groups containing from 2 to 10 carbon atoms; and —Y is a member of the class consisting of —X— and hydrogen; the remainder of the radicals of the said polyester which are joined by the said carbonyl-oxy linkages being selected from the group consisting of (1) divalent hydrocarbon radicals and (2) carbocyclic hydrocarbon radicals joined through oxaalkylene to the said carbonyl-oxy linkage; with the proviso that in at least about 80 mol percentage of the said repeating ester units in the said polyester, there is at least one divalent carbocyclic hydrocarbon ring containing at least six carbon atoms present as an integral part of the polymer chain and having a minimum of four carbon atoms between the points of attachment of the said ring in the polymer chain.

2. A linear carbonyl-oxy polyester composed of repeating ester units wherein the carbonyl-oxy linkages are an integral part of the polymer chain, having an intrinsic viscosity of at least about 0.20 in a mixture of 58.8 parts of phenol and 41.2 parts of trichlorophenol; the said polyester consisting of from about 0.5 mol percentage to about 10 mol percentage, based on the said ester units of the said polyester, of a basic dye sensitizing unit which is a metallic salt of the structure

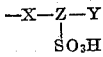

wherein

is a divalent radical of the class consisting of (1) an SO₃H substituted alkylene radical of such character that —X— is separated from the —SO₃H group by at least 3 carbon atoms and (2) an —SO₃H substituted arylene radical; —X— is a divalent member of the class consisting of carbonyl-oxy, oxy-polymethylene-oxy, poly(oxy-polymethylene)-oxy, carbonyl-oxy-polymethylene-oxy, and carbonyl-poly(oxy-polymethylene)-oxy, the said polymethylene groups containing from 2 to 10 carbon atoms; and —Y is a member of the class consisting of —X— and hydrogen; the remainder of the radicals of the said polyester which are joined by the said carbonyl-oxy linkages being divalent hydrocarbon with the proviso that in at least about 80 mol percentage of the said repeating ester units in the said polyester, there is at least one divalent carbocyclic hydrocarbon ring containing at least six carbon atoms present as an integral part of the polymer chain and having a minimum of four carbon atoms between the points of attachment of the said ring in the polymer chain.

3. A linear carbonyl-oxy polyester composed of repeating ester units wherein the carbonyl-oxy linkages are an integral part of the polymer chain, having an intrinsic viscosity of at least about 0.20 in a mixture of 58.8 parts of phenol and 41.2 parts of trichlorophenol; the said polyester consisting of from about 0.5 mol percentage to about 10 mol percentage, based on the said ester units of the said polyester, of a basic dye sensitizing unit which is a metallic salt of the structure

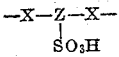

wherein —X— is carbonyl-oxy and

is an —SO₃H substituted alkylene radical of such character that the —SO₃H group is separated from carbonyl-oxy by at least three carbon atoms; the remainder of the radicals of the said polyester which are joined by the said carbonyl-oxy linkages being divalent hydrocarbon with the proviso that a para-phenylene radical is present in at least about 80 mol percentage of the said repeating ester units in the said polyester, the said para-phenylene radicals being attached in the said polymer chain to the carbonyl of the said carbonyl-oxy linkages.

4. A linear carbonyl-oxy polyester composed of repeating ester units wherein the carbonyl-oxy linkages are an integral part of the polymer chain, having an intrinsic viscosity of at least about 0.20 in a mixture of 58.8 parts of phenol and 41.2 parts of trichlorophenol; the said polyester consisting of from about 0.5 mol percentage to about 10 mol percentage, based on the said ester units of the said polyester, of a basic dye sensitizing unit which is a metallic salt of the structure

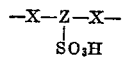

wherein —X— is carbonyl-oxy and

is an —SO₃H substituted arylene radical; the remainder of the radicals of the said polyester which are joined by the said carbonyl-oxy linkages being divalent hydrocarbon with the proviso that in at least about 80 mol percentage of the said repeating ester units in the said polyester, there is at least one divalent carbocyclic hydrocarbon ring containing at least six carbon atoms present as an integral part of the polymer chain and having a minimum of four carbon atoms between the points of attachment of the said ring in the polymer chain.

5. The polyester of claim 4 wherein the said divalent carbocyclic hydrocarbon ring is alicyclic.

6. The polyester of claim 4 wherein the said divalent carbocyclic hydrocarbon ring is aromatic.

7. The polyester of claim 6 wherein the said divalent carbocyclic hydrocarbon ring is para-phenylene attached in the said polymer chain to the carbonyl of the said carbonyl-oxy linkage, the oxy of the said carbonyl-oxy linkages being attached through ethylene.

8. The polyester of claim 7 wherein

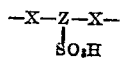

is

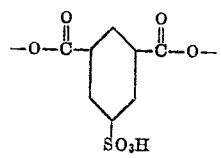

wherein the hexagon represents the benzene nucleus.

9. The polyester of claim 8 wherein the metal of the said metallic salt is lithium.

10. The polyester of claim 8 wherein the metal of the said metallic salt is calcium.

11. The polyester of claim 8 wherein the metal of the said metallic salt is sodium.

12. The polyester of claim 8 wherein the metal of the said metallic salt is lead.

13. The carbonyl-oxy polyester of claim 7 wherein the metallic sulfonate salt basic dye sensitizing unit constitutes from about 2 mol percentage to about 5 mol percentage based on the said ester units.

14. The polyester of claim 4 in the form of a film.

15. The polyester of claim 4 in the form of a fiber.

16. The fiber of claim 15 wherein the said fiber is permeated uniformly throughout by a cationic dye, the said dye being bound to the said polyester by the sulfonate group of the said sulfonate salt radical.

17. A linear carbonyl-oxy polyester composed of repeating ester units wherein the carbonyl-oxy linkages are an integral part of the polymer chain, having an intrinsic viscosity of at least about 0.20 in a mixture of 58.8 parts of phenol and 41.2 parts of trichlorophenol; the said polyester consisting of from about 0.5 mol percentage to about 10 mol percentage, based on the said ester units of the said polyester, of a basic dye sensitizing unit which is a metallic salt of the structure

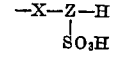

wherein —X— is carbonyl-oxy, and

is an —SO₃H substituted arylene radical; the remainder of the radicals of the said polyester which are joined by the said carbonyl-oxy linkages being divalent hydrocarbon with the proviso that a para phenylene radical is present in at least about 80 mol percentage of the said repeating ester units in the said polyester, the said para-phenylene radicals being attached in the said polymer chain to the carbonyl of the said carbonyl-oxy linkages.

18. A linear carbonyl-oxy polyester composed of repeating ester units wherein the carbonyl-oxy linkages are an integral part of the polymer chain, having an intrinsic viscosity of at least about 0.20 in a mixture of 58.8 parts of phenol and 41.2 parts of trichlorophenol; the said polyester consisting of from about 0.5 mol percentage to about 10 mol percentage, based on the said ester units of the said polyester, of a mixture of basic dye sensitizing radicals which are metallic salts of the structures

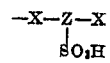

and

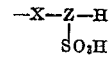

wherein —X— is carbonyl-oxy, and

is an —SO₃H substituted arylene radical; the remainder of the radicals of the said polyester which are joined by the said carbonyl-oxy linkages being divalent hydrocarbon with the proviso that a para-phenylene radical is present in at least about 80 mol percentage of the said repeating ester units in the said polyester, the said para-phenylene radicals being attached in the said polymer chain to the carbonyl of the said carbonyl-oxy linkages.

References Cited in the file of this patent

UNITED STATES PATENTS

| | | |
|---|---|---|
| 1,945,264 | Felix et al. | Nov. 14, 1933 |
| 2,028,091 | Jaeger | Jan. 14, 1936 |
| 2,176,423 | Jaeger | Oct. 17, 1939 |
| 2,244,192 | Flory | June 3, 1941 |
| 2,400,720 | Staudinger et al. | May 21, 1946 |
| 2,465,319 | Whinfield et al. | Mar. 22, 1949 |
| 2,744,094 | Caldwell | Oct. 3, 1952 |

FOREIGN PATENTS

| | | |
|---|---|---|
| 713,082 | France | Aug. 10, 1931 |

UNITED STATES PATENT OFFICE
CERTIFICATE OF CORRECTION

Patent No. 3,018,272 January 23, 1962

John Malcolm Griffing et al.

It is hereby certified that error appears in the above numbered patent requiring correction and that the said Letters Patent should read as corrected below.

Column 5, line 13, for "think" read -- thin --; column 6, lines 5 and 6, for "indolin" read -- indolium --; column 7, line 50, for "carob" read -- carbo --; column 8, line 41, for "aded" read -- added --; column 10, line 53, for "or" read -- of --; column 11, line 64, strike out the opening parenthesis, second occurrence; column 14, line 54, for "1,945,264" read -- 1,935,264 --.

Signed and sealed this 19th day of June 1962.

(SEAL)
Attest:

ERNEST W. SWIDER
Attesting Officer

DAVID L. LADD
Commissioner of Patents